US007761443B2

(12) United States Patent
Bhaghavan et al.

(10) Patent No.: US 7,761,443 B2
(45) Date of Patent: Jul. 20, 2010

(54) IMPLEMENTING ACCESS CONTROL FOR QUERIES TO A CONTENT MANAGEMENT SYSTEM

(75) Inventors: Rupa Bhaghavan, San Jose, CA (US); Tawei Hu, San Jose, CA (US); Kenneth Carlin Nelson, Hollister, CA (US); Randal James Richardt, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 12/123,723

(22) Filed: May 20, 2008

(65) Prior Publication Data

US 2008/0222708 A1     Sep. 11, 2008

Related U.S. Application Data

(63) Continuation of application No. 10/367,086, filed on Feb. 14, 2003, now Pat. No. 7,392,246.

(51) Int. Cl.
*G06F 17/30* (2006.01)
(52) U.S. Cl. .................. 707/708; 707/713; 707/736; 707/761; 707/783
(58) Field of Classification Search .......... 707/600–831
See application file for complete search history.

(56) References Cited

U.S. PATENT DOCUMENTS

| 4,751,740 | A | 6/1988 | Wright |
| 4,969,091 | A | 11/1990 | Muller |
| 5,204,961 | A | 4/1993 | Barlow |
| 5,321,841 | A | 6/1994 | East et al. |
| 5,455,953 | A | 10/1995 | Russell |
| 5,469,576 | A | 11/1995 | Dauerer et al. |
| 5,615,337 | A | 3/1997 | Zimowski et al. |
| 5,644,768 | A | 7/1997 | Periwal et al. |
| 5,696,898 | A | 12/1997 | Baker et al. |
| 5,701,458 | A | 12/1997 | Bsaibes et al. |
| 5,742,810 | A | 4/1998 | Ng et al. |
| 5,774,719 | A | 6/1998 | Bowen |

(Continued)

OTHER PUBLICATIONS

Lee, Chien-I, et al., "Design of a New Indexing Organization for a Class-Aggregation Hierarchy in Object-Oriented Databases", Journal of Information Science and Engineering 15, 1999, pp. 217-241, Taiwan.

(Continued)

*Primary Examiner*—Isaac M Woo
(74) *Attorney, Agent, or Firm*—Patterson & Sheridan, LLP

(57) ABSTRACT

A system to generate an SQL sub-expression that implement access control rules stored in a library server. The SQL sub-expression is then merged with the SQL passed from an application program interface (API). The access control checking mechanism is implemented on the server side of the content management system. In this client/server environment, the query SQL statement is built in two layers: the API (client) layer and the server layer. The API sends the query string to the underlying stored procedure. The stored procedure then generates the access control logic based on the configuration parameters of the library server. This access control logic is dynamically added to the query string sent by the API. The stored procedure prepares, builds and executes this new query string as a dynamic SQL statement.

6 Claims, 2 Drawing Sheets

U.S. PATENT DOCUMENTS

| | | | |
|---|---|---|---|
| 5,778,398 | A | 7/1998 | Nagashima et al. |
| 5,799,310 | A | 8/1998 | Anderson et al. |
| 5,819,252 | A | 10/1998 | Benson et al. |
| 5,826,268 | A | 10/1998 | Schaefer et al. |
| 5,859,966 | A | 1/1999 | Hayman et al. |
| 5,862,378 | A | 1/1999 | Wang et al. |
| 5,875,332 | A | 2/1999 | Wang et al. |
| 5,892,902 | A | 4/1999 | Clark |
| 5,940,616 | A | 8/1999 | Wang |
| 6,012,067 | A | 1/2000 | Sarkar |
| 6,016,394 | A | 1/2000 | Walker |
| 6,047,291 | A | 4/2000 | Anderson et al. |
| 6,055,637 | A | 4/2000 | Hudson et al. |
| 6,063,133 | A | 5/2000 | Li et al. |
| 6,065,117 | A | 5/2000 | White |
| 6,067,414 | A | 5/2000 | Wang et al. |
| 6,088,524 | A | 7/2000 | Levy et al. |
| 6,104,393 | A | 8/2000 | Santos-Gomez |
| 6,128,621 | A | 10/2000 | Weisz |
| 6,148,342 | A | 11/2000 | Ho |
| 6,161,182 | A | 12/2000 | Nadooshan |
| 6,167,405 | A | 12/2000 | Rosensteel, Jr. et al. |
| 6,173,400 | B1 | 1/2001 | Perlman et al. |
| 6,212,511 | B1 | 4/2001 | Fisher et al. |
| 6,219,826 | B1 | 4/2001 | De Pauw et al. |
| 6,233,586 | B1 | 5/2001 | Chang et al. |
| 6,263,313 | B1 | 7/2001 | Milsted et al. |
| 6,263,342 | B1 | 7/2001 | Chang et al. |
| 6,272,488 | B1 | 8/2001 | Chang et al. |
| 6,279,111 | B1 | 8/2001 | Jensenworth et al. |
| 6,282,649 | B1 | 8/2001 | Lambert et al. |
| 6,289,344 | B1 | 9/2001 | Braia et al. |
| 6,289,458 | B1 | 9/2001 | Garg et al. |
| 6,292,936 | B1 | 9/2001 | Wang |
| 6,308,274 | B1 | 10/2001 | Swift |
| 6,314,449 | B1 | 11/2001 | Gallagher et al. |
| 6,327,629 | B1 | 12/2001 | Wang et al. |
| 6,338,056 | B1 | 1/2002 | Dessloch et al. |
| 6,339,777 | B1 | 1/2002 | Attaluri et al. |
| 6,343,286 | B1 | 1/2002 | Lee et al. |
| 6,591,272 | B1 | 7/2003 | Williams |
| 2001/0002486 | A1 | 5/2001 | Kocher et al. |
| 2001/0008015 | A1 | 7/2001 | Vu et al. |
| 2001/0019614 | A1 | 9/2001 | Madoukh |
| 2001/0037317 | A1 | 11/2001 | Freiwirth et al. |
| 2003/0018607 | A1 | 1/2003 | Lennon et al. |
| 2003/0187848 | A1 | 10/2003 | Ghukasyan et al. |

OTHER PUBLICATIONS

Janneck, Jorn W. et al. "Modeling Hierarchical and Recursive Structures Using Parametric Petri Nets." Computer Engineering and Networks Laboratory, Swiss Federal Institute of Technology Zurich, pp. 445-452.

Kawaguchi Akira, et al., "Implementing Incremental View Maintenance in Nested Data Models" Database Programming Languages, 6.sup.th International Workshop, D8PL-6, Aug. 18-20, 1997 Proceedings, pp. 203-221.

Tian-Zu, Li, "Normalization of Nested Structure for Complex Objects" in Chinese, Journal of Software, vol. 9, No. 5, p. 390-396, May 1998, (with English Abstract).

Kim, Jeonghee, et al., "Visualization of Path Expressions in a Visual Object-Oriented Database Query Language," (2 pages).

IMPLEMENTING ACCESS CONTROL FOR QUERIES TO A CONTENT MANAGEMENT SYSTEM

CROSS REFERENCE TO RELATED APPLICATION

This is a continuation application to U.S. patent application Ser. No. 10/367,086, entitled "Method for Implementing Access Control for Queries to a Content Management System," filed on Feb. 14, 2003. This application is related to U.S. patent application Ser. No. 10/128,306, entitled "Content Management System and Methodology Featuring Query Conversion Capability for Efficient Searching," filed on Apr. 23, 2002, the contents of which is incorporated herein by reference.

FIELD OF THE INVENTION

The present invention generally relates to databases and more particularly to a method and apparatus for storing and accessing information in content management systems. More specifically, this invention pertains to a method for maintaining security rules for document and folder access within the query process of the content management system.

BACKGROUND OF THE INVENTION

Conventional content management systems typically include a library server (LS), one or more resource managers (RMs) and a client access application program interface (API). A client is coupled by a network to the API and seeks information stored in the resource manager. The library server stores metadata relating to the objects or data stored in the resource manager. The library server also controls the particular objects that a particular client user can access. Client users can submit requests known as queries through the API to search or retrieve metadata stored in the library server or objects stored in the resource manager.

Content management systems typically store three types of information, namely primary content (data), user metadata, and system metadata. Primary content is stored in the resource manager and includes both structured and semi-structured data such as text files, images, web pages, video clips, for example. Descriptions of, and information about the primary content stored in the resource manager, which are normally provided by client users, are referred to as "user metadata," and are stored in the library server.

In contrast to "user metadata," "system metadata" is the information created by the content management system itself for access control, storage management, and content tracking and reference. Both user metadata and system metadata reside in the library server that acts as a repository for the metadata in database form.

As compared to primary content, both user and system metadata are well structured. In general, content management systems provide a set of functions for content (data and metadata) creation, content search and retrieval, and content distribution that enable user to manage data, system metadata and user metadata. As mentioned earlier, one approach is to store the metadata in the library server and to store the primary content (data) in a separate component designated the resource manager. Another approach is to store both metadata and primary content in a common database.

In most content management systems, both system metadata and user metadata are searchable using SQL generated by a client-side API. For security purposes, the search methodology should allow only authorized personnel to view specific documents and folders. Skilled users can modify the SQL produced by the API to bypass security rules.

Current search mechanisms in content management systems can, in response to such a query, return to an unauthorized user a folder that matches a query. The folder does not include the sensitive information, but the existence of the folder gives information to the user that should not be released. Consequently, a skilled user can probe for the existence of classified or sensitive information through the query mechanism. By obtaining a response advising the user that a document matching the search request exists within the folder, a skilled user can search for other types of documents within the folder even though they are not actually authorized to view the documents, potentially creating a serious security exposure.

What is therefore needed is a system and method for enforcing security rules during a search for specific data stored in the content management system while maintaining the performance advantages of client-side query generation. The need for such a system and method has heretofore remained unsatisfied.

SUMMARY OF THE INVENTION

The present invention satisfies this need, and presents a system, a computer program product, and associated method (collectively referred to herein as "the system" or "the present system") for implementing access control for queries to a content management system. The present system, installed on the content management server, generates the SQL sub-expression to implement the access control rules and merge with the SQL passed from the API.

The content management system query API provides capabilities to search within an item type hierarchy, across item types, across linked items, multi-value attributes, versions, and references, as described, for example, in patent application Ser. No. 10/128,306, supra. In addition, a built-in access control checking mechanism is implemented on the server side of the content management system.

In this client/server environment, the query SQL statement is built in two layers: the API (client) layer and the server layer. The API sends the query string to the underlying stored procedure. The stored procedure then generates the access control logic based on the configuration parameters of the library server.

This access control logic is dynamically added to the query string sent by the API. The stored procedure prepares, builds and executes this new query string as a dynamic SQL statement. The present system allows the content management system query to have the performance advantages of client-side query generation while maintaining the full security model enforced by the server.

In a client/server system, either the client or the database server could enforce the security by ensuring that the calls made to the server are legal. However, if the access control logic were included in the SQL generated by the API, a security exposure would exist because someone with skill could modify the SQL expression passed to the stored procedure and bypass security.

The present system circumvents this security risk by including the access control logic on the server side of the content management system. The server generates the SQL sub-expression that implements the access control rules. The SQL sub-expression is then merged with the SQL passed from the API.

The present system provides a stored procedure interface for clients to pass query information using SQL. Any user with the appropriate technical skills can use the relatively simple interface of the present system with ease. One feature of the stored procedure interface is that the SQL passed is updated dynamically with the access control privilege information of the user obtained from the library server. In addition, the access control logic is applied to all the intermediate steps of the query. This adds a new level of security to the content management system. The present system maintains security rules even if SQL sent to the server is modified by users with impressive SQL skills.

The present system utilizes SQL within the API and stored procedures. The concept of the present system could be applied to other query languages and other client/server systems that include query processing.

The present system can be protected by viewing the CLI (call level interface) trace and the event monitor (or equivalent tool). The CLI trace provides information on all parameters passed to the stored procedure, including the SQL string sent by the API, but without the SQL to implement the access control logic. The event monitor would have the completed SQL statement in addition to the access control logic.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

API: Application Program Interface, a language and message format used by an application program to communicate with the operating system or some other control program such as a database management system (DBMS) or communications protocol.

Attribute: a property or characteristic, and more particularly, a field in a database.

Item: The basic information entities managed by the library server. "Items" as used herein come in two types, simple items and resource items. An item can be, for example, a folder or a document.

Metadata: data about data. Metadata is definitional data that provides documentation of or information about other data managed within an environment or by an application. Metadata may document data about data elements or attributes such as name, size, or data type. It may also log data about data structures including length, fields, and columns. Other data included in Metadata encompass the association, storage location, and ownership of data. Metadata may additionally include descriptive information about the context, quality and condition, and/or characteristics of data.

SQL: Structured Query Language, a standardized query language for requesting information from a database.

Figure 1:
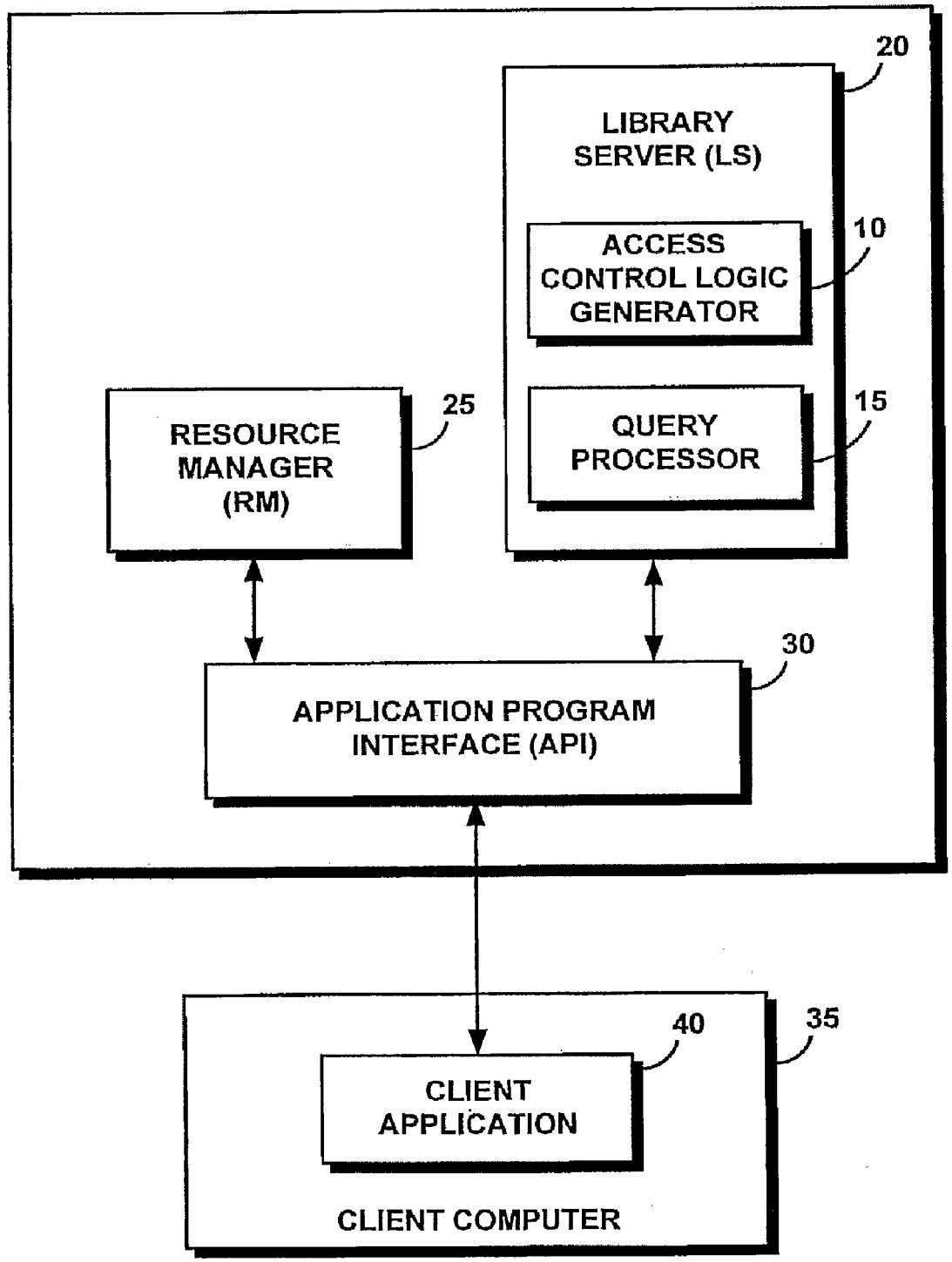
FIG. 1 is a high level block diagram of a content management system in which an access control logic system of the present invention can be used.

FIG. 1 illustrates an exemplary content management system 100 comprising an access control logic generator (or system) 10 installed with a query processor 15 in a library server 20. In addition, content management system 100 comprises resource manager 25 and application programming interface 30. The access control logic generator 10 includes a software programming code or computer program product that is typically embedded within, or installed on a computer. Alternatively, the access control logic generator 10 can be saved on a suitable storage medium such as a diskette, a CD, a hard drive, or like devices.

A client computer 35 including a client application 40 is coupled to content management system 100 via the application program interface (API) 30. Library server (LS) 20 is coupled to application program interface 30 and receives queries from client application 40. These queries seek information that is stored in library server 20 and/or resource manager 25. Library server 20 includes a query processor 15 that receives queries in a first format from client computer 35 and translates the queries into a second format usable by library server 20.

Library server 20 is coupled to resource manager 25 and contains user and system metadata concerning the primary content (data or objects) that are stored in resource manager 25. Many types of data can be stored in resource manager 25, for example, business information, applications, text, audio, video and streaming data, to name a few.

Content management system 100 employs a rich data model wherein data including metadata is stored in a tree-based hierarchical data structure including multiple database tables. Traditionally, search on the metadata is through either a specific API or via SQL language on some systems. Since content management systems in general provide a much richer data model than their underlying database systems, writing search queries based on a specific API or SQL can be both tedious and inefficient in content management systems without query processor 15. The content management system 100 with its query processor 15 advantageously insulates the client user from these high levels of query complexity.

Figure 2:
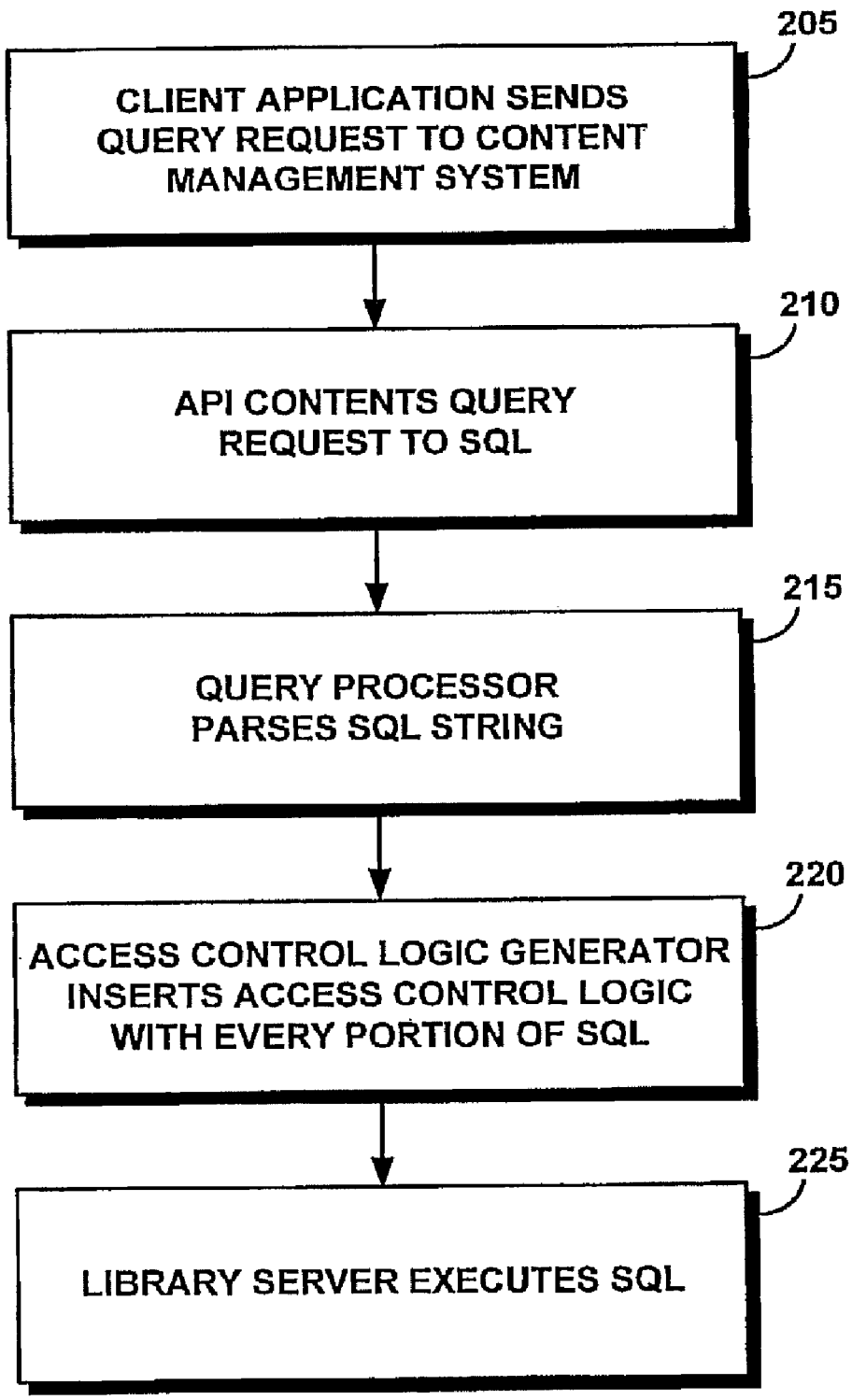
FIG. 2 is a process flow chart illustrating a method of operation of the access control logic system of FIG. 1.

The access control logic generator 10 restricts which items will be included in the query. Method 200 of content manager 100 utilizing access control logic generator 10 is illustrated by the block diagram of FIG. 2. At block 205, the client application 40 sends a query request to content management system 100. The application program interface 30 converts the query to SQL at block 210.

At block 215, the query processor 15 parses the SQL string. The access control logic generator then inserts access control logic with every portion of the SQL string parsed in block 215. The access control logic is created according to access control privilege information of the user obtained from the library server 20. The library server 20 then executes the resulting SQL statement at block 225.

A sample query that is not expressed in query language can be exemplified as follows:

Find folders where (criteria)

Containing documents where (criteria).

The first portion of the query, "Find folders where (criteria)", requests access to a folder matching some user specified criteria. If the user does not have access to the folder, the query is not resumed by the content management system. This level of security is already implemented by content management systems.

The second portion of this query, "containing documents where (criteria)", requests documents matching the user's specified criteria. If the user does not have access to the document, previously the document portion of the query would not be resumed, but the folder request might be returned to the user. To eliminate this potential breach of security, the access control logic generator 10 inserts access control in both portions of the sample query, preventing either document or folder information returning to the user in the absence of proper authorization.

A sample query string sent by the application program interface 30 to the query processor 15 is shown below:

```
SELECT DISTINCT
    ICMCLIENTEXITS_1.ITEMID,
    ICMCLIENTEXITS_1.COMPONENTID,
    ICMCLIENTEXITS_1.VERSIONID,    400 AS
    COMPONENTTYPEID,    400 AS
    ITEMTYPEID   FROM
    ICMADMIN.ICMUT00400001
    ICMCLIENTEXITS_1   WHERE
    (ICMCLIENTEXITS_1.ITEMTYPEVIEW ID =
    1009) AND
```

The access control logic generator 10 generates the following SQL string to verify access authorization of the user.

```
((( ((EXISTS (SELECT 1 FROM ICMADMIN.ICMSTCOMPILEDACL AS C3,
ICMADMIN.ICMSTITVIEWDEFS AS V3 WHERE V3.ITEMTYPEID=400 AND
V3.ITEMTYPEVIEW ID IN (400) AND C3.ACLCODE=V3.ACLCODE AND
C3.USERID='ICMADMIN' AND C3.PRIVDEFCODE=ICM_PRIV_ITEM_SQL_SELECT)) OR
(EXISTS (SELECT 1 FROM ICMADMIN.ICMSTCOMPILEDACL AS C4,
ICMADMIN.ICMSTITVIEWDEFS AS V4, ICMADMIN.ICMSTCOMPILEDPERM AS P4
WHERE V4.ITEMTYPEID=400 AND V4.ITEMTYPEVIEW ID IN (400) AND
C4.ACLCODE=V4.ACLCODE AND C4.USERKIND=ICM_USERKIND_PUBLIC AND
C4.PRIVDEFCODE=ICM_PRIV_ITEM_SQL_SELECT AND
C4.PRIVDEFCODE=P4.PRIVDEFCODE AND P4.USERID='ICMADMIN'))))))
```

The access control logic generator 10 then includes the access control logic string with the query string, as shown below:

```
SELECT DISTINCT ICMCLIENTEXITS_1.ITEMID, ICMCLIENTEXITS_1.COMPONENTID,
ICMCLIENTEXITS_1.VERSIONID, 400 AS COMPONENTTYPEID, 400 AS ITEMTYPEID FROM
ICMADMIN.ICMUT00400001 ICMCLIENTEXITS_1 WHERE
(ICMCLIENTEXITS_1.ITEMTYPEVIEWID = 1009) AND
((( ((EXISTS (SELECT 1 FROM ICMADMIN.ICMSTCOMPILEDACL AS C3,
ICMADMIN.ICMSTITVIEWDEFS AS V3 WHERE V3.ITEMTYPEID=400 AND V3.ITEMTYPEVIEWID
IN (400) AND C3.ACLCODE=V3.ACLCODE AND C3.USERID='ICMADMIN' AND
C3.PRIVDEFCODE=ICM_PRIV_ITEM_SQL_SELECT)) OR (EXISTS (SELECT 1 FROM
ICMADMIN.ICMSTCOMPILEDACL AS C4, ICMADMIN.ICMSTITVIEWDEFS AS V4,
ICMADMIN.ICMSTCOMPILEDPERM AS P4 WHERE V4.ITEMTYPEID=400 AND
V4.ITEMTYPEVIEWID IN (400) AND C4.ACLCODE=V4.ACLCODE AND
C4.USERKIND=ICM_USERKIND_PUBLIC AND C4.PRIVDEFCODE=ICM_PRIV_ITEM_SQL_SELECT
AND C4.PRIVDEFCODE=P4.PRIVDEFCODE AND P4.USERID='ICMADMIN'))))))
```

It is to be understood that the specific embodiments of the invention that have been described are merely illustrative of certain application of the principle of the present invention. Numerous modifications may be made to the system and method for implementing access control for queries to a content management system invention described herein without departing from the spirit and scope of the present invention.

What is claimed is:

1. A computer program product having instruction codes stored on a computer-useable medium for implementing access control for a query to a content management system that includes a content management server, the computer program product comprising:

a set of instruction codes executed at a user processor for transmitting the query to the content management server;

wherein the user processor is remotely located relative to the content management server to prevent user access to the content management server and to prevent the bypass of the security of the content management server;

a set of instruction codes executed at the content management server, for parsing the query into a plurality of portions;

a set of instruction codes executed at the content management server, for creating an access control logic string for the query according to an access control privilege information of the user, wherein the access control logic string is query language that prohibits an unauthorized user from accessing restricted data;

a set of instruction codes executed at the content management server, for inserting the access control logic string in each portion of the query that has been parsed to generate a dynamic query, wherein the dynamic query is a result of adding the access control logic string to each of the plurality of portions of the query; and a set of instruction codes for executing the dynamic query; and a set of instruction codes for generating a secure query result.

2. The computer program product of claim 1, further comprising a set of instruction codes for obtaining the access control privilege of the user from a library server.

3. A processor-implemented system for implementing access control for a query to a content management system that includes a content management server, the system comprising:

means for transmitting the query to the content management server from a user processor;

wherein the user processor is remotely located relative to the content management server to prevent user access to the content management server, to prevent the bypass of the security of the content management server;

means for parsing the query into a plurality of portions at the content management server;

means for creating an access control logic string for the query at the content management server according to an access control privilege information of the user, wherein the access control logic string is query language that prohibits an unauthorized user from accessing restricted data; and means for inserting the access control logic string in each portion of the query string that has been parsed at the content management server to generate a dynamic query, wherein the dynamic query is a result of adding the access control logic string to each of the plurality of portions of the query;

means for executing the dynamic query; and means for generating a secure query result.

4. The system of claim 3, further comprising means for obtaining the access control privilege of the user from a library server.

5. A content management system, comprising:

a library server containing a user metadata and a system metadata describing a primary content in a resource manager coupled to the library server, the library server comprising:

an access control logic generator, the access control logic generator inserting access control throughout a first query to prevent access to both the primary content and the user and system metadata describing the primary content from unauthorized users;

a query processor that receives a plurality of queries in a first format from a client computer and translates a plurality of queries into a second format usable by the library server; and an application program interface, the application program interface coupled between the library server and the resource manager, wherein data is transferred between the library server and the resource manager via the application program interface.

6. The content management system of claim 5 wherein a client computer having a client application is coupled to the content management system via the application program interface.

* * * * *